Dec. 13, 1955  J. M. CAMPBELL  2,726,590
LAWN PERFORATOR
Filed April 27, 1953  2 Sheets-Sheet 1
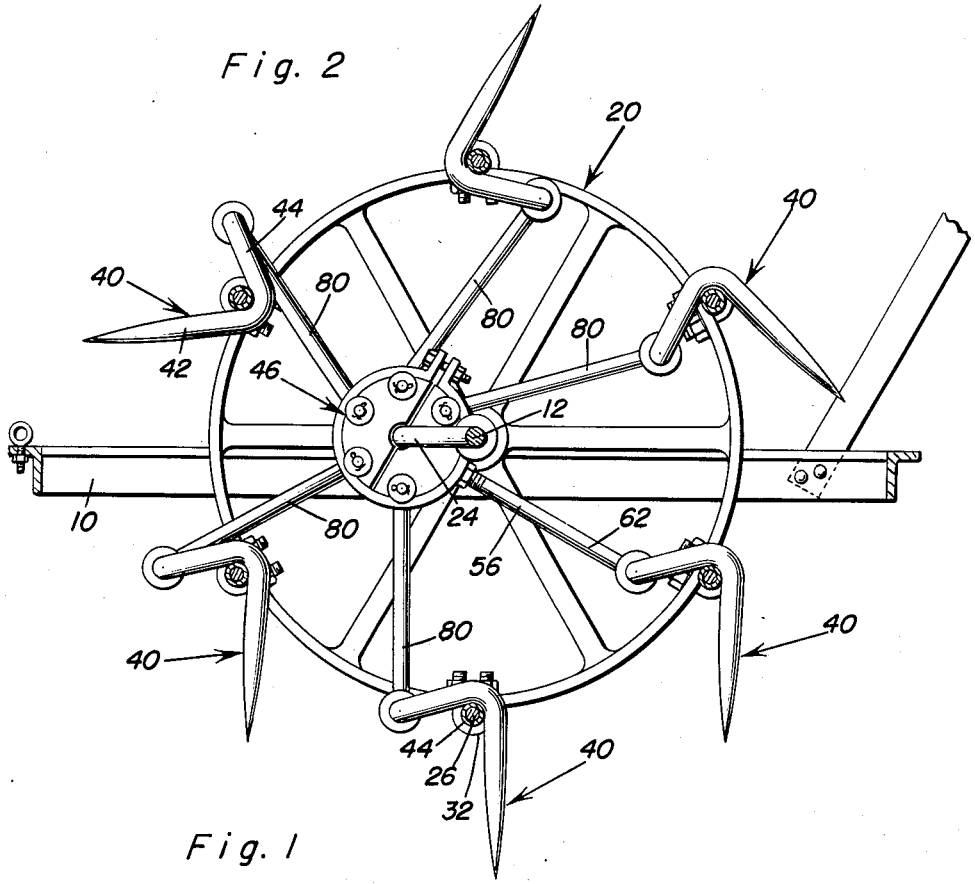
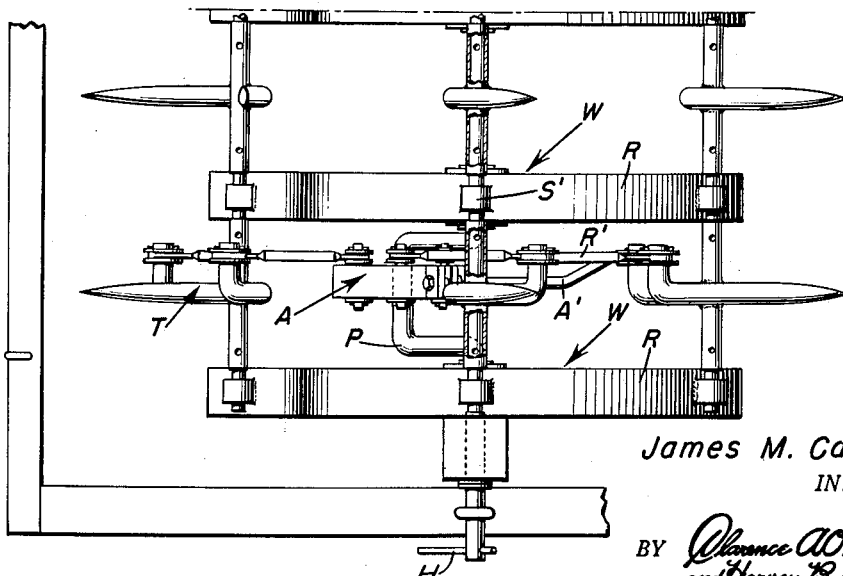
James M. Campbell
INVENTOR.
BY Clarence A. O'Brien
and Harvey B. Jacobson
Attorneys Dec. 13, 1955  J. M. CAMPBELL  2,726,590
LAWN PERFORATOR Filed April 27, 1953  2 Sheets-Sheet 2

James M. Campbell
INVENTOR.

BY Clarence A. O'Brien
and Harvey B. Jacobson
Attorneys

United States Patent Office 2,726,590
Patented Dec. 13, 1955

2,726,590

LAWN PERFORATOR

James M. Campbell, Seattle, Wash., assignor of fifty per cent to Clarence D. Lawrence, Seattle, Wash.

Application April 27, 1953, Serial No. 351,288

1 Claim. (Cl. 97—52)

This invention relates to new and useful improvements in lawn perforating devices and the primary object of the present invention is to provide a machine which may be hand operated, self-propelled or towed for perforating lawns, golf courses, bowling greens and the like to allow moisture and fertilizer to penetrate hard soil and matted roots.

Another very important object of the present invention is to provide a lawn perforator including rotatable wheels supporting pivotally mounted ground penetrating teeth and a novel and improved mechanism operatively connected to the teeth for maintaining the pointed ends of the teeth in a vertical position during the cycle of entering, fully perforating and receding from the ground.

A further object of the present invention is to provide a lawn perforator of the aforementioned character involving a crankshaft for the mechanism, which crankshaft may be retained in a selected rotated position upon a supporting frame in accordance with the position of the shaft with respect to the hitch point between the frame of the perforator and a towing vehicle.

A still further aim of the present invention is to provide a lawn perforator that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of one form of the present invention which is used for perforating relatively large areas;

Figure 2 is a reduced fragmentary vertical sectional view taken substantially on the plane of section line 2—2 of Figure 3 to show the invention in modified form;

Figure 4:
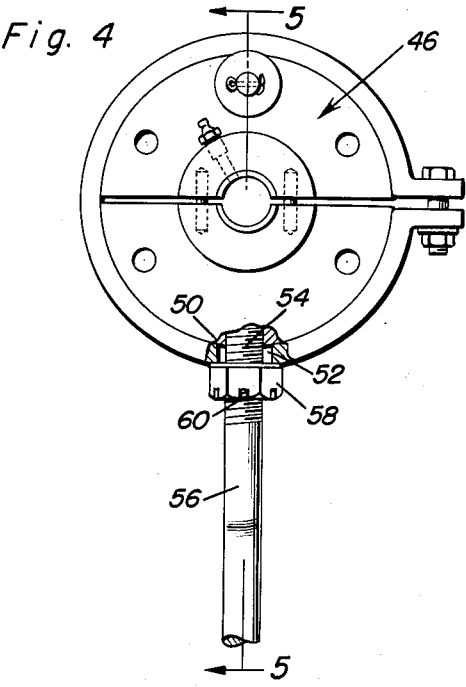
Figure 4 is a fragmentary view, partly in section and partly in elevation, showing the bearing assembly and the driver arm connected thereto.

Referring now to the drawings in detail, wherein for the purpose of illustration, there is disclosed a preferred embodiment of the present invention, the numeral 10 represents a frame to which the ends of a horizontal stationary shaft or axle 12 are secured by U-bolts 14. The bearing hub portions 16 and 18 of spoked wheels 20 and 22 are journaled for rotation on the shaft 12 and are located on opposite sides of a crank portion 24 formed in the shaft.

Spaced parallel horizontal holding shafts or rods 26 extend between the rim portions 28 and 30 of the wheels 20 and 22 and are terminally clamped against the rim portions 28 and 30 by U-bolts 32. The holding shafts 26 rockably support substantially V-shaped rigid teeth or spikes 38 each of which is provided with a pointed outer leg portion 40 and an inner leg portion 42. Bearings or tubes 44 are fixed by welding or the like to the apices of the teeth 38 and accommodate the intermediate portions of the shafts 26 whereby the teeth 38 will be located between the wheels 20 and 22.

A split-type bearing assembly 46 is rotatably supported on crank portion 24 and includes an assembly band 48 that retains the bearing-forming halves clamped together and engaged with crank portion 24. The bearing assembly 46 is provided with a radially disposed threaded aperture 50 which faces an aperture 52 and band 48 so that the threaded end 54 of a rigid driver arm 56 may be threadingly engaged in aperture 50. A lock nut 58 threaded on end 54 engages band 48 and is held to the driver arm 56 by a removable pin 60 which extends through a transverse opening in the end 54.

The outer offset end portion 62 of arm 56 terminates in an eye 64 that receives the angulated horizontal end 66 of one of the teeth 38. Washers 68 are secured on the ends 66 of teeth 38 with the eye 64 disposed between the washers 68 on the tooth engaged with the arm 56.

Figure 5:
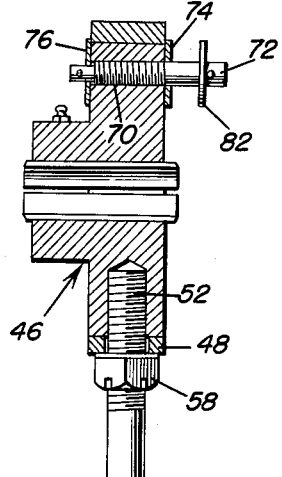
Figure 5 is a vertical sectional view taken substantially on the plane of section line 5—5 of Figure 4.
Figure 3:
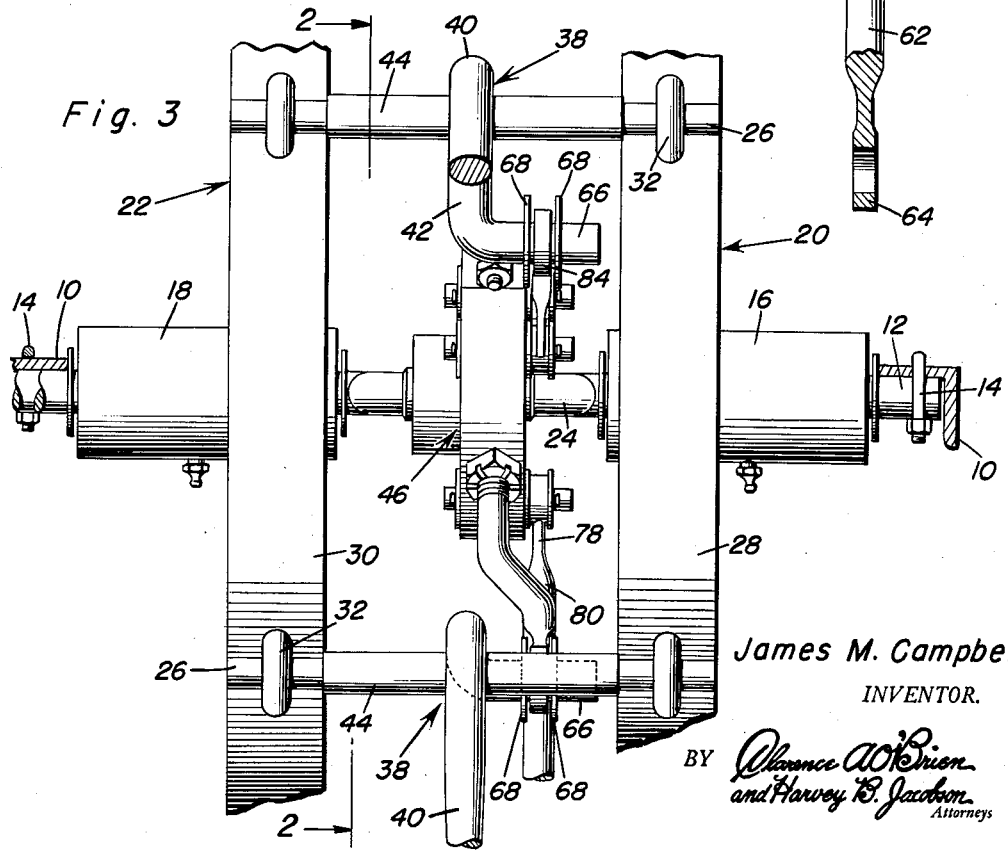
Figure 3 is an enlarged fragmentary top plan view of the form of the invention illustrated in Figure 2.

Bearing assembly 46 is provided with a plurality of circumferentially spaced internally threaded horizontal apertures 70 that receivably engage pivot pins 72. Washers 74 and 76 on the pins 72 rest against opposite sides of the assembly 46 as shown in Figure 5. Pins 72 are engaged with the inner eye ends 78 of connecting rods or pitmans 80 and washers 82 are suitably retained on the pins 72 in spaced relation to the washers 74 to define a confining space for the ends 78 of rods 80.

The outer eye ends 84 of the connecting rods 80 receive the angulated ends 66 of the teeth other than the tooth engaged with arm 56. Ends 84 are disposed between the spaced washers 68 of the teeth to which they are engaged.

In practical use of the present invention, the frame may be suitably attached to a moving vehicle, such as a tractor, or a small electric motor or gasoline engine may be supported on the frame and operatively connected to the wheels to drive the frame over the ground. Idler wheels may be supported on the frame when the machine is self-propelled.

As the wheels are rotated, the spokes 40 reciprocate on an arc of approximately 170° which causes the pointed leg portions 42 to remain in a vertical position during the cycle of entering, fully perforating and receding from the surface. This vertical position is adjustable by loosening U-bolts 14 and rotating crankshaft 12 to proper position by use of hand gripping pin H. Adjustment is necessary when the machine is towed by a tractor with a tow hook position higher or lower than the center of the perforator.

For perforating relatively large areas, the machine is modified to include a series of longitudinally spaced wheels W whose rims R are journaled in circumferentially spaced horizontal bearings S' suitably secured to the rims R. The crank portion P of wheel supporting shaft S is again operatively connected to the teeth T by a hub assembly A, connecting rods R' and a driver arm A'. However, the shafts S' are rotatable on the wheels W and are connected to the series of teeth supported thereon and to the arms A' and rods R' so that a single mechanism will actuate the teeth throughout the length of the frame, this construction being shown in Figure 1 of the drawings.

What is claimed as new is as follows:

A lawn perforator comprising a frame, a shaft held stationary on the frame, a ground wheel rotatably supported by said shaft and having a rim, a plurality of circumferentially spaced substantially V-shaped penetrating teeth having apices rockably carried by said rim, said teeth each including an outer end portion extending outwardly from the rim and an inner end portion, said stationary shaft having a crank portion, a hub assembly rotatably supported on said crank portion, a driver arm for said hub assembly rigidly secured to said hub assembly and extending radially outwardly therefrom, said arm being pivotally engaged with the inner end portion of one of said teeth, and connecting rods connecting said hub assembly to the inner end portions of the other teeth to urge the outer end portions of said teeth to a vertical position as the teeth approach the ground over which the frame is moving, said hub assembly comprising half sections and a clamping band surrounding and holding the same together, said driver arm extending through said band and being threaded into one of said half sections to prevent said band from turning on said half sections.

References Cited in the file of this patent

UNITED STATES PATENTS

| | | |
|---|---|---|
| 229,106 | Dominy | June 22, 1880 |
| 942,376 | Clardy | Dec. 7, 1909 |
| 1,027,125 | Guidiner | May 21, 1912 |
| 2,601,591 | Colombo | June 24, 1952 |

FOREIGN PATENTS

| | | |
|---|---|---|
| 13,943 | Great Britain | of 1852 |
| 272,172 | Switzerland | Feb. 16, 1951 |